No. 760,364. Patented May 17, 1904.

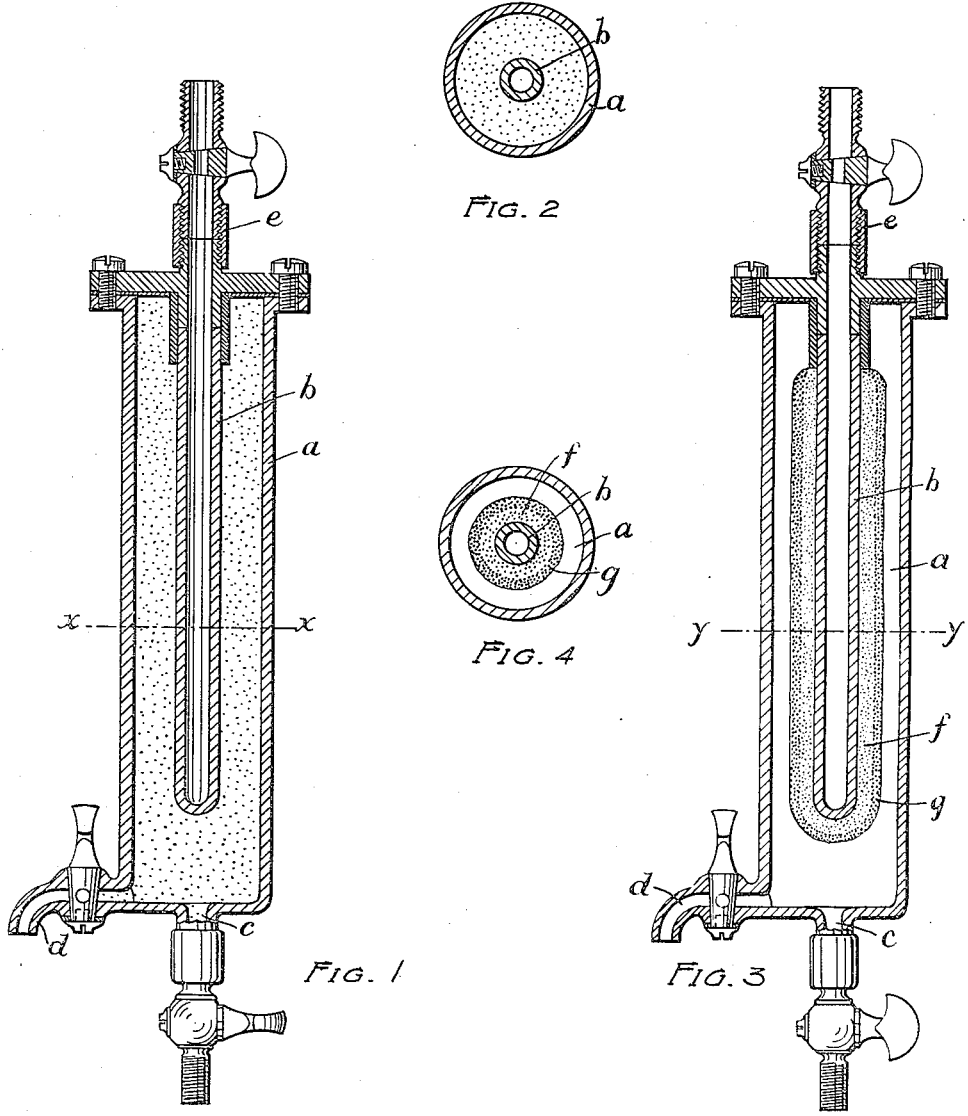

UNITED STATES PATENT OFFICE.

JAMES G. WOOLWORTH, OF PROVIDENCE, RHODE ISLAND.

FILTER AND METHOD OF MAKING SAME.

SPECIFICATION forming part of Letters Patent No. 760,364, dated May 17, 1904.

Application filed February 18, 1903. Serial No. 143,992. (No model.)

*To all whom it may concern:*

Be it known that I, JAMES G. WOOLWORTH, of Providence, in the county of Providence and State of Rhode Island, have invented a certain new and useful Filter and Method of Making the Same; and I do hereby declare the following specification, taken in connection with the accompanying drawings, forming a part of the same, to be a full, clear, and exact description thereof.

My invention is more particularly designed for the purification of water for drinking or for domestic purposes, but may be employed in the purification of liquids other than water.

The invention consists in the application to a suitable filter body or support of a chemical precipitate, so as to form upon said body or support a coating which will arrest and prevent the passage of the impurities in the water.

In carrying out my invention I prefer to employ as the body or support for the precipitate coating a tube, of porcelain, clay, or other suitable material, such as has been heretofore employed as the filtering medium. It has been found in practice that these tubes do not effectually prevent the passage of impurities or microbes and disease germs, which not only enter the walls of the tubes, but frequently pass therethrough. In the use of these tubes it has been necessary to subject them to a frequent cleaning, and in order to remove the impurities which have permeated the wall of the tube it has been necessary to scrape the surface of the tube and very frequently to remove more or less of the wall of the tube itself, as by turning in a lathe. This is objectionable, as it has the effect to lessen the thickness of the wall, and consequently the length of time during which the tube can be used. Even these methods of cleaning are not effective to remove the impurities which accumulate in the walls of the tube, and in practice it has been found that even after the best method of cleaning the speed of flow is reduced, and although frequently cleaned it is found that after continued use only a small fraction of the original speed of delivery is attainable.

By my improvement the tube is to be coated with a coating which is itself impervious to the passage of the impurities, and so that said impurities will be prevented from reaching the filter-tube, which is thereby kept free from such impurities, and consequently does not require to be subjected to any cleaning operation other than simple washing, and each time the coating is renewed the speed of delivery is the same as that obtained from a new tube.

The coating for the filter-tube is composed of a chemical precipitate and may be applied to the tube in any desired manner so as to coat the same to the desired thickness; but it is preferred to deposit the chemical precipitate upon the tube by the flow of the water. In such case it is obvious that the chemical precipitate may either be formed outside of the chamber and introduced into the chamber or may be formed within the chamber. For the best results it is preferred to produce this depositing of the coating on the tube by the passage through the chamber referred to of water which has previously been filtered or purified, and so that no impurities will become intermingled with the coating as it is being deposited on the tube.

The chemical precipitate may consist of any suitable compound which is insoluble in the liquid to be purified. Such precipitates as are flocculent and voluminous give the best results, and by selecting a precipitate which has also an affinity for soluble impurities in the liquid, such as coloring-matter, the degree of purification is increased. For the purification of water I prefer to employ the hydrated oxid of aluminium, also known as "aluminium hydroxid," which may be prepared by any of the well-known methods by precipitation from a solution of any soluble aluminium compound by the proper chemical reagent.

The coating when applied to the tube or deposited thereon is compressible and becomes gradually compressed by the pressure and flow of the water, and thus becomes more and more dense and impervious to the impurities contained in the liquid. To guard against any cracking of the coating, I prefer to mix with the precipitate a suitable quantity of fibrous material, such as mineral wool, for example.

By the employment of a coating, as above indicated, the insoluble impurities, including microbes and disease germs, will be arrested and deposited upon the exterior of the coating of precipitate and will not penetrate the same. It will be further understood that all soluble coloring-matter or other impurities in solution contained in the liquid which have an affinity for the precipitate will in passing into the precipitate coating be reacted upon and retained therein. In other words, the precipitate coating acts not only mechanically to prevent the passage of the insoluble impurities, but also acts chemically upon the soluble impurities.

Referring to the accompanying drawings, Figure 1 is a vertical longitudinal section of an ordinary tube-filter, showing the chamber filled with liquid containing the precipitate in suspension. Fig. 2 is a transverse section of Fig. 1 on the line $x$ $x$. Fig. 3 is a corresponding vertical longitudinal section of a tube-filter, showing the precipitate applied to the filter-tube and forming a coating thereon and showing a layer of impurities on the exterior of the precipitate coating. Fig. 4 is a transverse section of Fig. 3 on the line $y$ $y$.

$a$ represents a chamber in which the filter-tube $b$ is suspended, said chamber being provided with an inlet $c$ and with a drain-outlet $d$ for removing the contents of the chamber when desired. The liquid, as will be understood, passes through the walls of the filter-tube $b$ from the exterior to the interior thereof and thence through the outlet $e$. The inlet $c$, the drain-outlet $d$, and the outlet $e$ are preferably provided with suitable valves or cocks, as shown.

When the precipitate is to be deposited upon the tube $b$ by the flow of the water, a quantity of the precipitate suspended in water is placed in the chamber $a$, sufficient to substantially fill the same, as shown in Fig. 1. With the cocks in the inlet $c$ and the outlet $e$ open and the cock in the drain-outlet $d$ closed, as shown in Fig. 3, the water will flow into the chamber $a$ and thence through the walls of the tube $b$ and through the outlet $e$. This flow of the water causes the precipitate to gradually deposit itself upon the surface of the tube $b$ and to form thereon a coating $f$, Figs. 3 and 4, which coating gradually becomes more and more dense and compact under the pressure and flow of the water.

It will be found that in the employment of a coating of the character referred to the insoluble impurities will be prevented from entering the coating and will be deposited upon the exterior surface thereof and form a layer $g$ thereon, as shown in Figs. 3 and 4.

When desired to clean the filter, all that is required to be done is to take out the tube $b$, with the deposits thereon, and remove the precipitate coating and layer of impurities from the tube, which may readily be done with a brush or otherwise. It will be found when the coating has thus been removed that the filter-tube, even after a long period of use, is entirely clean, showing that the impurities have not reached said tube. It will be further found that when again put into use the speed of flow through the tube will be as great as when the tube was new, showing that the pores of the tube have not become clogged with impurities, as has heretofore been the case.

It will be seen that with my invention the compacted cohering chemical precipitate coating becomes the chief filtering medium, and the principal function of the tube of clay or porcelain is to act as a suitable support for the precipitate coating.

What I claim as my invention, and desire to secure by Letters Patent, is—

1. The method of making filters which consists in applying to a suitably-formed body or support a coating composed of a chemical precipitate, substantially as described.

2. The method of making filters which consists in applying to a suitably-formed body or support a coating composed of a flocculent chemical precipitate, substantially as described.

3. The method of making filters which consists in employing a tube or formed support located within a chamber forming a part of the water-passage, and introducing into said chamber a chemical precipitate, whereby as the water flows through said chamber and through the tube or support said precipitate will be deposited upon the exterior surface of the tube or support, substantially as described.

4. The method of making filters which consists in employing a tube or formed support located within a chamber forming a part of the water-passage, and introducing into said chamber a chemical precipitate, whereby as the water flows through said chamber and through the tube or support said precipitate will be deposited upon the exterior surface of the tube or support and be compacted thereon by the pressure and flow of the liquid, substantially as described.

5. The method of making filters which consists in applying to a suitable body or support a coating composed of a chemical precipitate having fibrous material mixed therewith, substantially as described.

6. The method of making filters which consists in the application to a filter-formed body or support of a chemical precipitate which will arrest and prevent the passage of insoluble impurities, and also chemically react upon the soluble impurities contained in the liquid, substantially as described.

7. A filter comprising a suitably-formed body or support provided with a coating composed of a chemical precipitate, substantially as described.

8. A filter comprising a suitable body or support provided with a coating composed of a chemical precipitate having fibrous material mixed therewith, substantially as described.

9. A filter comprising a suitably-formed body or support provided with a chemical precipitate which will arrest and prevent the passage of insoluble impurities, and also chemically react upon the soluble impurities, substantially as described.

JAMES G. WOOLWORTH.

Witnesses:
W. H. THURSTON,
C. G. BRADLEY.